(12) United States Patent
Yoshida et al.

(10) Patent No.: US 10,468,950 B2
(45) Date of Patent: Nov. 5, 2019

(54) METHOD OF MANUFACTURING LAMINATED CORE

(71) Applicants: Mitsui High-tec, Inc.; TOYOTA JIDOSHA KABUSHIKI KAISHA, Toyota-shi, Aichi (JP); AISIN AW CO., LTD., Anjo-shi, Aichi (JP)

(72) Inventors: Kohei Yoshida, Kitakyushu (JP); Junya Satake, Kitakyushu (JP); Keiichi Kaneshige, Seto (JP); Meio Gi, Anjo (JP)

(73) Assignees: MITSUI HIGH-TEC, INC., Kitakyushu-Shi, Fukuoka (JP); TOYOTA JIDOSHA KABUSHIKI KAISHA, Toyota-Shi, Aichi (JP); AISIN AW CO., LTD., Anjo-Shi, Aichi (JP)

( * ) Notice: Subject to any disclaimer, the term of this patent is extended or adjusted under 35 U.S.C. 154(b) by 0 days.

(21) Appl. No.: 15/334,162

(22) Filed: Oct. 25, 2016

(65) Prior Publication Data
US 2017/0117781 A1    Apr. 27, 2017

(30) Foreign Application Priority Data
Oct. 26, 2015    (JP) ................. 2015-209932

(51) Int. Cl.
*H02K 15/03* (2006.01)
*B29C 65/48* (2006.01)
(Continued)

(52) U.S. Cl.
CPC ............ *H02K 15/03* (2013.01); *B29C 65/48* (2013.01); *H02K 15/12* (2013.01);
(Continued)

(58) Field of Classification Search
CPC ............ H02K 1/27; H02K 1/28; H02K 1/274; H02K 15/03
See application file for complete search history.

(56) References Cited

U.S. PATENT DOCUMENTS

| | | | |
|---|---|---|---|
| 2013/0228280 A1* | 9/2013 | Hirayama | H02K 15/03 156/293 |
| 2013/0234363 A1 | 9/2013 | Nagai et al. | |
| 2013/0307363 A1* | 11/2013 | Sano | H02K 1/2766 310/156.01 |

FOREIGN PATENT DOCUMENTS

| | | |
|---|---|---|
| CN | 103069698 A | 4/2013 |
| CN | 103339831 A | 10/2013 |

(Continued)

OTHER PUBLICATIONS

Machine Translation of JP2008-054376 (Year: 2008).*
Office Action for related CN App No. 201610924929.2 dated Aug. 2, 2018, 6 pgs.

*Primary Examiner* — Christopher T Schatz
(74) *Attorney, Agent, or Firm* — Procopio, Cory, Hargreaves & Savitch LLP

(57) ABSTRACT

This disclosure relates to a method of manufacturing a laminated core including a plurality of poles arranged side by side in a circumferential direction, each pole having three or more magnet housing holes and magnets housed in the magnet housing holes. The manufacturing method includes: a step of preparing a lamination having the magnet housing holes; a step of injecting sealing resin into a pair of magnet housing holes arranged at symmetric positions with respect to a line extending in a radial direction of the lamination, with the magnets being disposed in the pair of respective magnet housing holes; and a step of injecting sealing resin into another magnet housing hole, with the magnet being disposed in the magnet housing hole.

9 Claims, 14 Drawing Sheets

(51) Int. Cl.
*H02K 15/12* (2006.01)
*H02K 1/27* (2006.01)
*B29L 31/00* (2006.01)

(52) U.S. Cl.
CPC ........ *B29L 2031/7498* (2013.01); *H02K 1/27* (2013.01); *H02K 1/274* (2013.01); *H02K 1/276* (2013.01); *H02K 1/2766* (2013.01)

(56) References Cited

FOREIGN PATENT DOCUMENTS

| | | |
|---|---|---|
| JP | 2008-054376 A | 3/2008 |
| JP | 2013-102622 A | 5/2013 |
| JP | 2015082911 A | 4/2015 |
| JP | 2015154686 A | 8/2015 |

\* cited by examiner

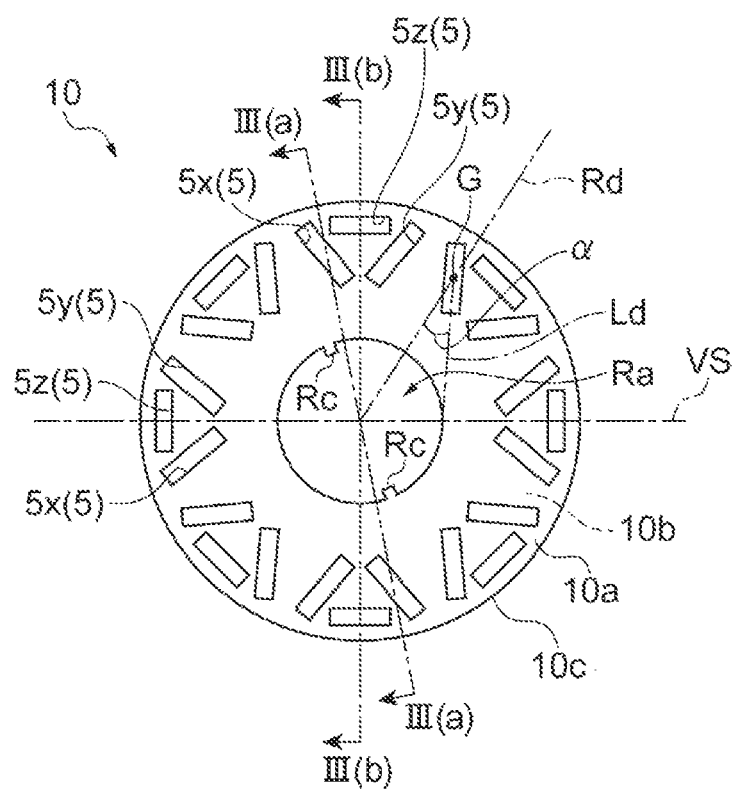

METHOD OF MANUFACTURING LAMINATED CORE

CROSS-REFERENCE TO RELATED APPLICATION

This application is based upon and claims the benefit of priority from Japanese Patent Application No. 2015-209932, filed Oct. 26, 2015, the entire contents of which are incorporated herein by reference.

BACKGROUND

1. Field

This disclosure relates to a method of manufacturing a laminated core.

A laminated core is a component of a motor. A laminated core is formed by stacking a plurality of core pieces processed in a predetermined, shape and fastening the pieces together. The motor includes a rotor and a stator each of which contains a laminated core, and is produced through a step of winding a coil on the stator and a step of attaching a shaft to the rotor, for example. Motors incorporating laminated cores have been conventionally used as driving sources for appliances, such as a refrigerator, an air conditioner, a hard disc drive, and an electric tool, and are also used as driving sources for hybrid cars in recent years.

A rotor has a plurality of poles, and each of the poles has one or more permanent magnets. One or more permanent magnets are housed in each hole provided to the rotor. Hereinafter this hole will be referred to as a "magnet housing hole", as appropriate. This hole is sometime generally referred to as a "slot". A motor configured in such a manner is referred to as an interior permanent magnet (IPM) motor.

2. Related Background Art

Japanese Unexamined Patent Publication No. 2008-54376 discloses a method of inserting one permanent magnet into each hole provided to a core body, and then sealing the permanent magnet using a resin member. As illustrated in FIG. 1(A) in Japanese Unexamined Patent Publication No. 2008-54376, permanent magnets 14 are inserted into holes 12 while a core body 13 is held between an upper mold 15 and a lower mold 16, and the sealing resin is supplied into the holes 12 from resin reservoir pots 17 (resin pot) provided to the upper mold 15. In this manner, the resin member 18 is filled between the internal surface of each hole 12 and the external surface of the corresponding permanent magnet 14.

SUMMARY

One aspect of the present invention relates to a method of manufacturing a laminated core including a plurality of poles arranged side by side in a circumferential direction, each pole having three or more magnet housing holes and magnets housed in the magnet housing holes. This manufacturing method includes: a step (A) of preparing a lamination having the magnet housing holes; a step (B) of injecting sealing resin into a pair of magnet housing holes among the three or more magnet housing holes, the pair of magnet housing holes being arranged at symmetric positions with respect to a line extending in a radial direction of the lamination, with the magnets being disposed in the pair of respective magnet housing holes; and a step (C) of injecting sealing resin into a magnet housing hole other than the pair of magnet housing holes among the three or more magnet housing holes, with the magnet being disposed in the magnet housing hole.

BRIEF DESCRIPTION OF THE DRAWINGS

FIG. 2 is a plan view of the rotor illustrated in FIG. 1A;

DETAILED DESCRIPTION

Figure 1A:
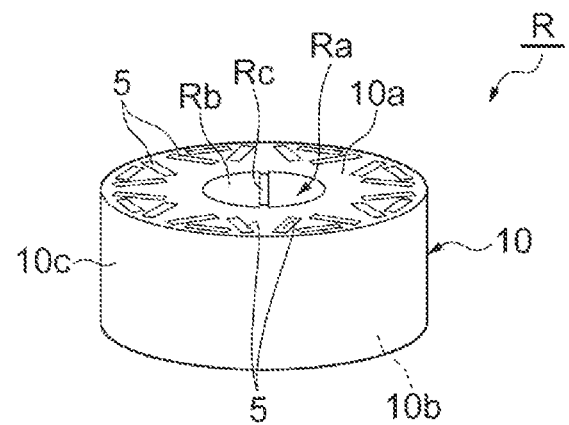
FIG. 1A is a perspective view illustrating a rotor made from a laminated core.

A plurality of embodiments of this disclosure will now be explained in detail with reference to some drawings. In the explanation hereunder, the same reference numerals are used for the elements having the same components or the same functions, and redundant explanations thereof are omitted. Hereinafter the positions of elements are explained with reference to the orientation of the lamination while the sealing resin is being injected. For example, the surface of the lamination facing upwardly while the sealing resin is being injected is referred to as a "top surface".

<Rotor and Stator Making Up Motor Core>

FIG. 1A is a perspective view of a laminated core R making up a rotor. The laminated core R has a substantially cylindrical shape, and an opening Ra positioned at the center is for mounting a shaft (not illustrated). The inner circumferential surface Rb by which the opening Ra is formed is provided with a protruding key Rc.

Figure 1B:
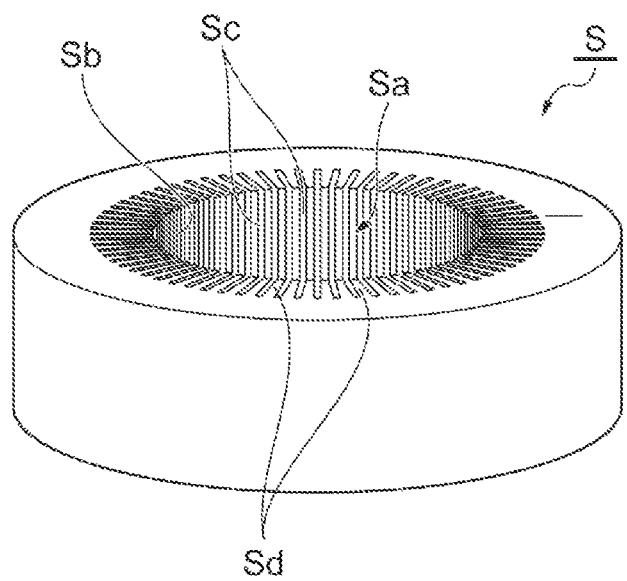
FIG. 1B is a perspective view illustrating a stator made from a laminated core.

FIG. 1B is a perspective view of a laminated core S making up a stator. The laminated core S also has a substantially cylindrical shape, and an opening Sa positioned at the center is for mounting the laminated core (rotor) R. A number of grooves Sc extending in the thickness direction are provided on the inner circumferential surface Sb of the laminated core S. Coils are wound around protruding portions Sd that are formed by the grooves Sc.

<Laminated Core Making Up Rotor>

The laminated core (rotor) R illustrated in FIG. 1A will now be explained in detail, also with reference to FIGS. 2, 3A and 3B. The laminated core R has a plurality of poles arranged side by side along the circumferential direction, and includes a cylindrical lamination 10 which is a lamination of a plurality of electromagnetic steel sheets 1, a plurality of magnet housing holes 5 extending from the top surface 10a toward the bottom surface 10b of the lamination 10, magnets 7 that are housed in the magnet housing holes 5, and sealing resin 9 for sealing the magnet housing holes 5. Among the elements of the laminated core R, the magnets 7 and the sealing resin 9 are not illustrated in FIG. 2.

The lamination 10 is made from the electromagnetic steel sheets 1 that are adjacent to each other in the up-and-down direction, and joined together by interlocking, for example. The magnet housing holes 5 are provided to the lamination 10 as pass-through holes for housing the magnets 7. The magnet housing hole 5 is provided in plurality, per each pole of the lamination 10. More specifically, three magnet housing holes 5 are provided per each one of eight poles of the lamination 10. In other words, the lamination 10 has twenty-four magnet housing holes 5 in total.

Provided as the magnet housing holes 5 correspondingly to each of the poles of the lamination 10 are magnet housing holes 5x and 5y (a pair of magnet housing hole) positioned at symmetrical positions with respect to a virtual line VS (see FIG. 2) extending in a radial direction, and a magnet housing hole 5z (a magnet housing hole other than the pair of magnet housing holes) that is provided interposed between the magnet housing hole 5x and 5y in the plan view. The line VS is a line passing through the center of the area of the corresponding pole in the circumferential direction. Therefore, the magnet housing holes 5x and 5y are arranged symmetrically in the circumferential direction with respect to the line VS passing through the center of the area of the corresponding pole. The magnet housing holes 5x, 5y have the same shape, and extend in the radial direction of the lamination 10 in the plan view. The magnet housing hole 5z, by contrast, extends in the circumferential direction of the lamination 10 in the plan view. Configurations in which the magnet housing holes 5x, 5y extend in the radial direction of the lamination 10 include a configuration in which the magnet housing holes 5x, 5y extend in directions inclined by a predetermined angle with respect to the radial direction of the lamination 10 (e.g., an angle equal to or less than 45 degrees). In other words, as illustrated in FIG. 2, a configuration can be said to have the "magnet housing holes 5x, 5y extending in the radial direction of the lamination 10", even when the a radial line segment Rd passing through the center of gravity G of the magnet housing hole 5x (or the magnet housing hole 5y) forms an angle α of 45 degrees or less with a line segment Ld extending in the longitudinal direction of the magnet housing hole 5x (or the magnet housing hole 5y) and passing through the center of gravity G. In the same manner, a configuration in which the magnet housing hole 5z extends in the circumferential direction of the lamination 10 includes a configuration in which the magnet housing hole 5z extends in a direction inclined by a predetermined angle (e.g., an angle equal to or less than 45 degrees) with respect to the circumferential direction of the lamination 10.

Although the magnet housing holes 5x, 5y are explained to have the same shape, the magnet housing holes 5x, 5y may have different shapes, without limitation to such an example. Each of the poles of the lamination 10 may be provided with a weight-reducing hole that is a pass-through hole other than the magnet housing holes 5x, 5y, 5z. As illustrated in FIG. 2, the magnet housing holes 5x, 5y, 5z are provided near the outer circumference 10c of the lamination 10.

The magnet housing holes 5 corresponding to the respective poles are arranged at an equal interval along the outer circumference 10c of the lamination 10. The sealing resin is injected into the three magnet housing holes 5x, 5y, 5z corresponding to the same pole from a corresponding resin pot 41 (see FIGS. 8 and 9; the details will be described later). The total number of the magnet housing holes 5 is not limited to 24, and may be determined as appropriate based on the application of the motor and the required performance. The shapes and the positions of the magnet housing holes 5 may also be determined as appropriate, based on the application of the motor and the required performance.

Figure 3A:
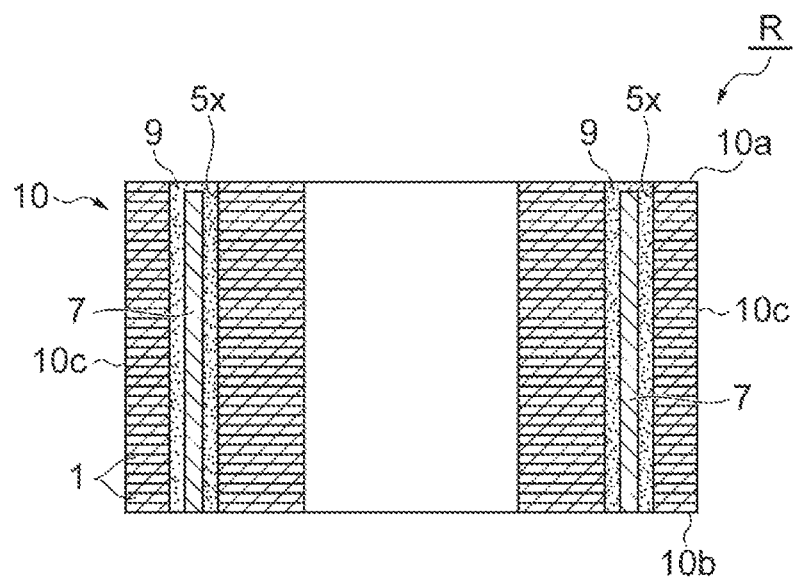
FIG. 3A is a sectional view across the line III(a)-III(a) in FIG. 2.
Figure 3B:
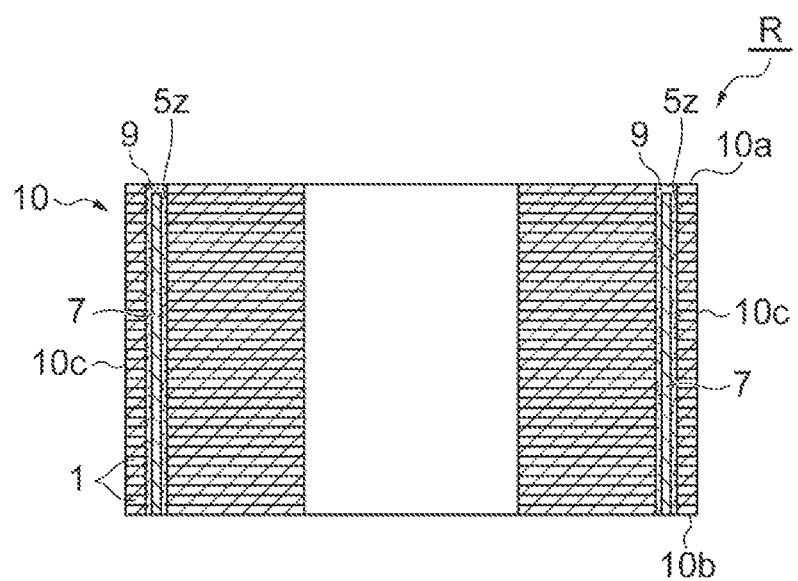
FIG. 3B is a sectional view across the line III(b)-III(b) in FIG. 2.

A magnet 7 is housed in each of the magnet housing holes 5 (see FIGS. 3A and 3B). The magnet 7 is a permanent magnet, and a sintered magnet, such as a neodymium magnet, may be used, for example. The number of magnets 7 inserted into each of the magnet housing holes 5 may be two or more. The type of the magnets 7 may be determined as appropriate, based on the application of the motor and the required performance, and a bond magnet may also be used, instead of a sintered magnet, for example.

The sealing resin 9 is a matrix resin made of a thermosetting resin composition, for example. A specific example of the thermosetting resin includes a resin composition including epoxy resin, curing initiator, and additive. Examples of the additive include filler, flame retardant, and stress-relaxation agent.

<Method of Manufacturing Laminated Core Making Up Rotor>

A method of manufacturing the laminated core R making up the rotor will now be explained with reference to FIGS. 4 to 9. The laminated core R is manufactured through the following steps:

a step (A) of preparing the lamination 10 having the magnet housing holes 5x, 5y, 5z;

a step (B) of injecting the sealing resin 9 into the magnet housing holes 5x, 5y provided at symmetrical positions with respect to the line VS, with the magnets 7 being disposed in the respective magnet housing holes 5x, 5y;

a step (C) of injecting the sealing resin 9 into the magnet housing hole 5z provided interposed between the magnet housing holes 5x, 5y, with the magnet 7 being disposed in the magnet housing hole 5z; and a step (D) of hardening the sealing resin 9 having been injected into the magnet housing holes 5 at the step (B) and the step (C) with heat.

Any one of the step (B) and the step (C) may be performed before the other, but explained in the embodiment is an example in which the step (B) is performed before the step (C).

To begin with, the lamination 10 with the magnet housing holes 5x, 5y, 5z is prepared (step (A)). These three magnet housing holes 5x, 5y, 5z extend from the top surface 10a to the bottom surface 10b in a manner passing through the lamination 10.

Figure 4A:
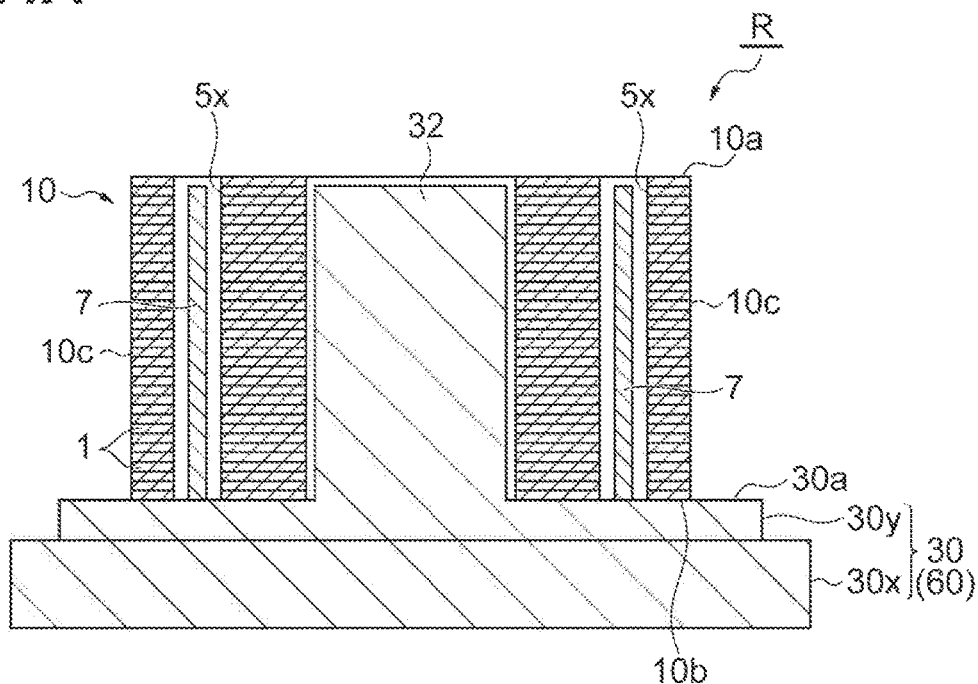
FIG. 4A is a sectional view schematically illustrating an arrangement in which the lamination illustrated in FIG. 3A is set to a lower mold.
Figure 4B:
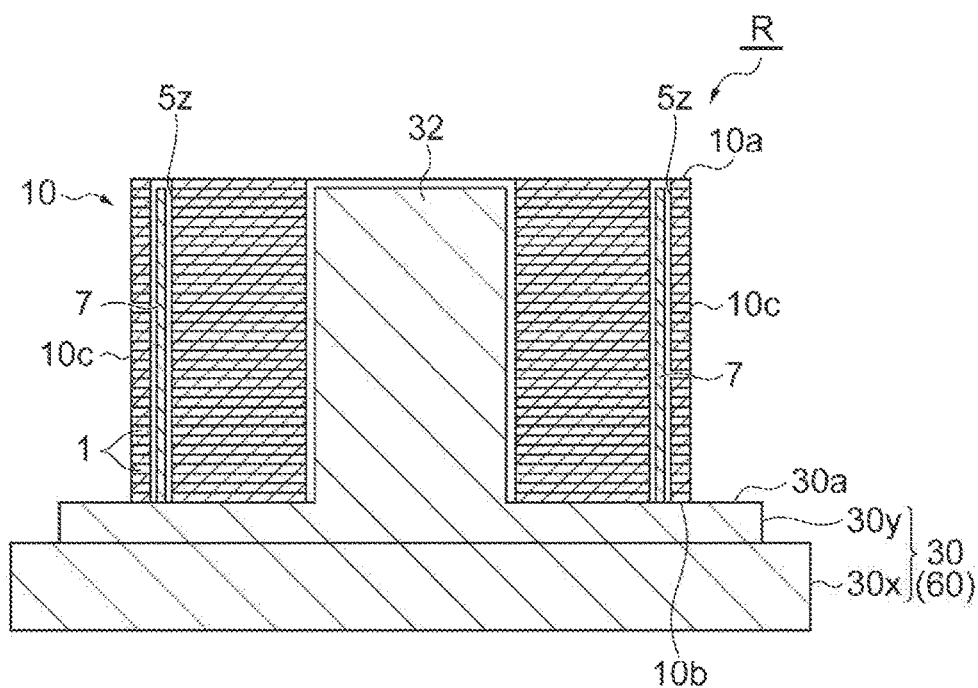
FIG. 4B is a sectional view schematically illustrating an arrangement in which the lamination illustrated in FIG. 3B is set to the lower mold.
Figure 7A:
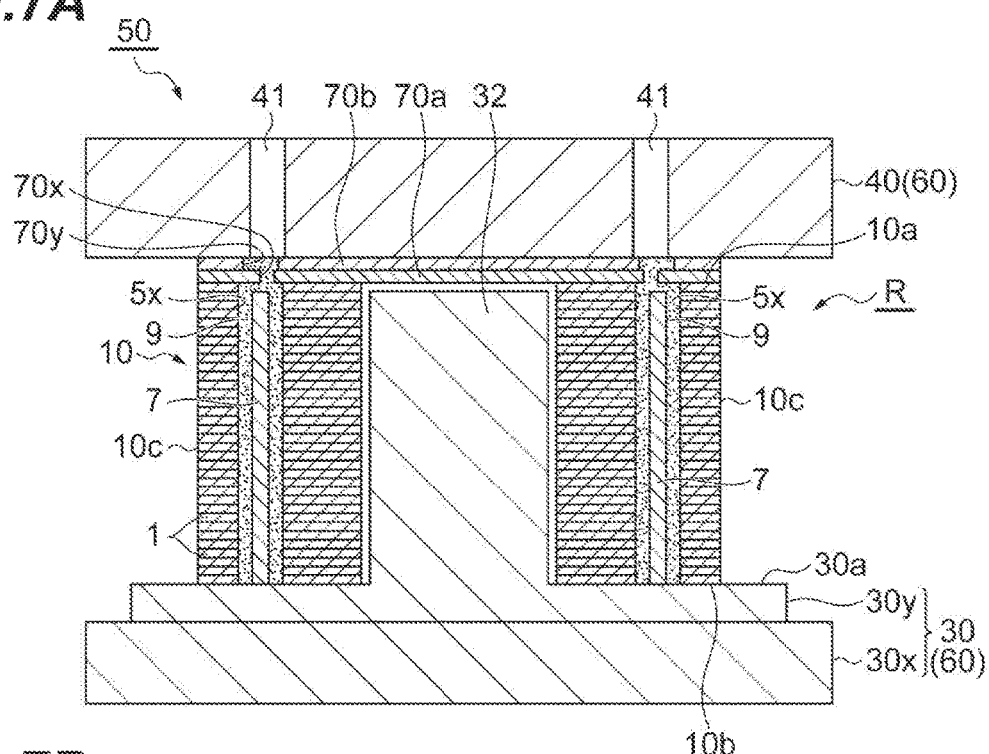
FIG. 7A is a sectional view schematically illustrating an arrangement in which the lamination illustrated in FIG. 6B is set to the upper mold and the lower mold.
Figure 7B:
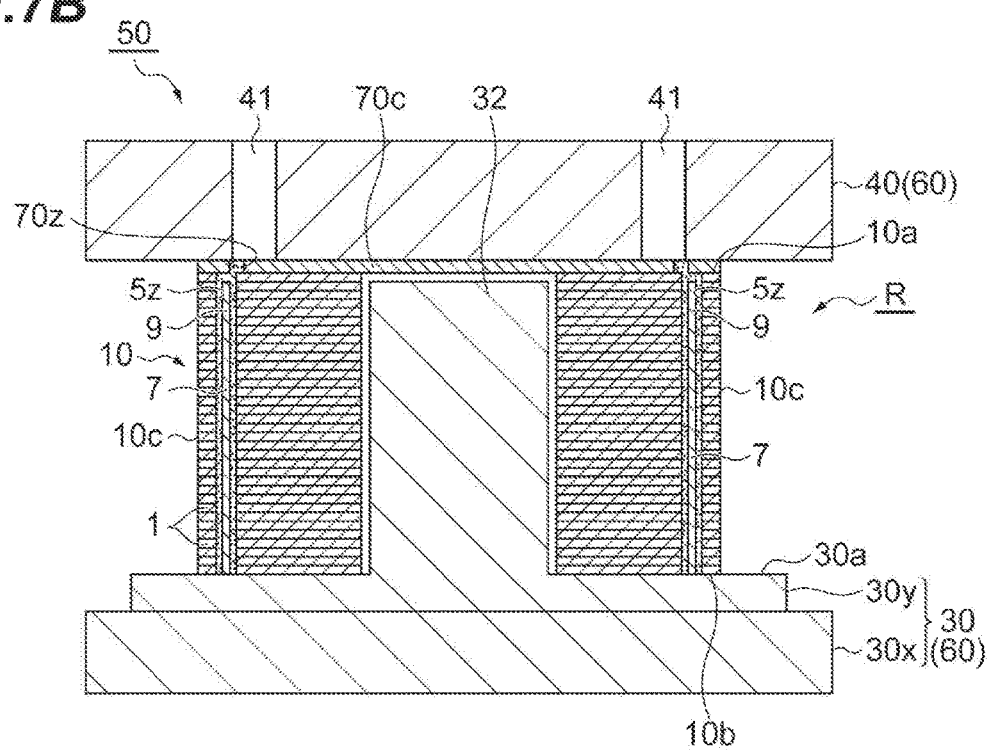
FIG. 7B is a sectional view schematically illustrating an arrangement in which the lamination illustrated in FIG. 6C is set to the upper mold and the lower mold.

The magnets 7 are then fixed in the magnet housing holes 5, using a resin sealing device 50 provided with a mold 60 including a lower mold 30 and an upper mold 40 (see FIGS. 7A and 7B). To begin with, as illustrated in FIGS. 4A and 4B, the lamination 10 is placed on the lower mold 30. The lower mold 30 is provided with a lamination mounting plate 30y on which the lamination 10 is placed, and a lower mold plate 30x on which the lamination mounting plate 30y is placed. In the lower mold 30, a pillar-shaped portion 32 is provided on the top surface 30a of the lamination mounting plate 30y. The surface of the pillar-shaped portion 32 has a recessed key (not illustrated) extending in the up-and-down direction. With the lamination 10 placed on the pillar-shaped portion 32, this recessed key engages with the protruding key Rc, so that the rotation of the lamination 10 is prevented thereby. In the lower mold 30, the lamination mounting plate 30y including a surface abutting against the bottom surface 10b of the lamination 10, and the pillar-shaped portion 32 are configured separable from the lower mold plate 30x, and these separable parts make up the conveying tray for the lamination 10. Placing the lamination 10 on the lower mold 30 means placing the lamination 10 on the conveying tray, and placing the conveying tray between the upper mold 40 and the lower mold 30. The lamination 10 may be placed on the lower mold plate 30x without using the lamination mounting plate 30y serving as the conveying tray. With the lamination 10 placed on the lower mold 30, the magnets 7 are inserted into the respective magnet housing holes 5x, 5y, 5z provided correspondingly to each of the poles.

With the magnets 7 being disposed in the magnet housing holes 5x, 5y, corresponding to each of the poles, that are arranged at symmetrical positions with respect to the line VS, the sealing resin 9 is injected into magnet housing holes 5x, 5y (step (B)). The step (B) will now be explained in detail with reference to FIGS. 5A, 5B, 6A, 6B, 7A, and 8. For the convenience of the explanation, only the magnet housing hole 5z, among the magnet housing holes 5x, 5y, 5z, is not illustrated in FIGS. 6A and 6B, and only the magnet housing holes 5x, 5y are illustrated.

At the step (B), to begin with, the lamination 10 is placed between the upper mold 40 and the lower mold 30. The upper mold 40 has a plurality of resin pots 41 capable of storing therein pellets P serving as sealing resin 9 for sealing (see FIG. 8; the pellets are sometimes referred to as tablets). One resin pot 41 is provided per each pole. In other words, each of the resin pots 41 is provided correspondingly to the three magnet housing holes 5x, 5y, 5z at the corresponding pole. Cull plates 70a and 70b (first plates) are disposed between the lamination 10 and the upper mold 40 including the resin pots 41 (see FIG. 7A). More specifically, the cull plate 70a is placed on the top surface 10a of the lamination 10 (see FIG. 6A), and the cull plate 70b is further placed on top of the cull plate 70a (see FIGS. 6B and 7A).

Figure 5A:
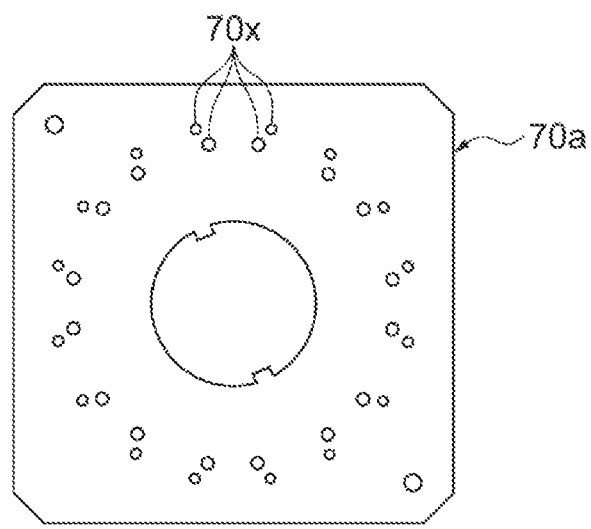
FIGS. 5A to 5C are plan views of cull plates placed on the lamination.

As illustrated in FIG. 5A, the cull plate 70a is provided with a plurality of pass-through holes passing through the cull plate 70a in the thickness direction. These pass-through holes serve as resin flow paths 70x communicably connecting with the magnet housing holes 5x, 5y (FIGS. 6A and 7A) when the cull plate 70a is placed on the lamination 10. Each of the resin flow paths 70x has a substantially circular shape in the plan view (see FIG. 5A), and two resin flow paths 70x are provided for one magnet housing hole 5x (or one magnet housing hole 5y) (see FIG. 6A). The number of pass-through holes provided correspondingly to one magnet insertion hole is not limited to two, and may be one, or three or more. The number of pass-through holes are set as appropriate, depending on the size of the magnet insertion hole and the amount of resin to be injected.

Figure 5B:
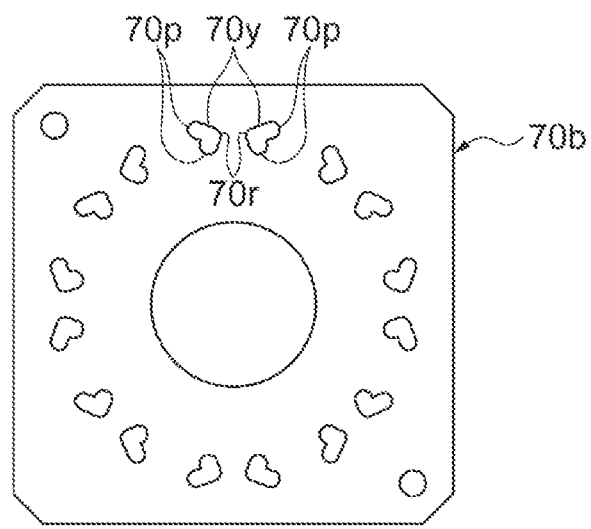

As illustrated in FIG. 5B, the cull plate 70b is provided with a plurality of pass-through holes passing through the cull plate 70b in the thickness direction. These pass-through holes serve as resin flow paths 70y communicably connecting the resin pot 41 included in the upper mold 40 and the resin flow paths 70x when the cull plate 70b is placed between the cull plate 70a and the upper mold 40 (see FIGS. 6B and 7A). A first resin flow path communicably connecting the resin pot 41 and the pair of magnet housing holes 5x, 5y is formed by each of the resin flow path 70x and the corresponding resin flow path 70y. Each of the resin flow path 70y has a substantial heart-like shape in the plan view (see FIG. 5B), and one resin flow path 70y is provided correspondingly to one magnet housing hole 5x (or one magnet housing holes 5y) (see FIG. 6B). Tip portions 70p of the resin flow path 70y having a heart-like shape in the plan view are provided in a manner surrounding the external perimeter of the corresponding resin flow path 70x that is substantially circular in the plan view, in a configuration in which the cull plate 70b is placed on the cull plate 70a (see FIG. 6B). The base-end portion 70r of the resin flow path 70y protrudes internally further from the resin flow path 70x (toward the magnet housing hole 5x or the magnet housing hole 5y provided as a pair), in a configuration in which the cull plate 70b is placed on the cull plate 70a (see FIG. 6B). Explained herein is an example in which the two cull plates 70a, 70b are used overlapping each other, but the cull plate may be used in singularity. In such a configuration, a cull plate including both of the pass-through holes serving as the resin flow paths 70x and the pass-through holes serving as the resin flow paths 70y may be used.

Figure 8:
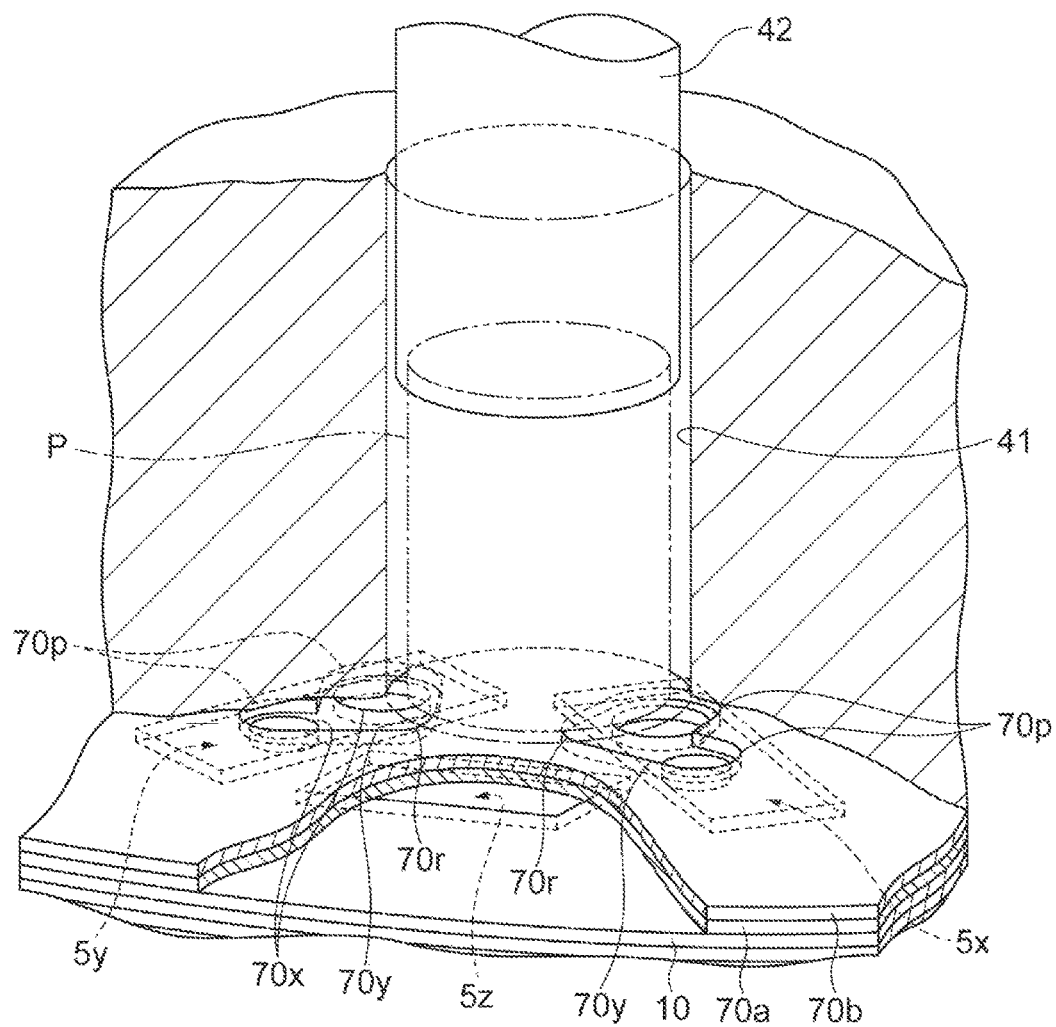
FIG. 8 is a partially cutaway perspective view schematically illustrating neighbors around a resin pot while the resin is injected into the magnet housing holes using the cull plates illustrated in FIGS. 5A and 5B.
Figure 9:
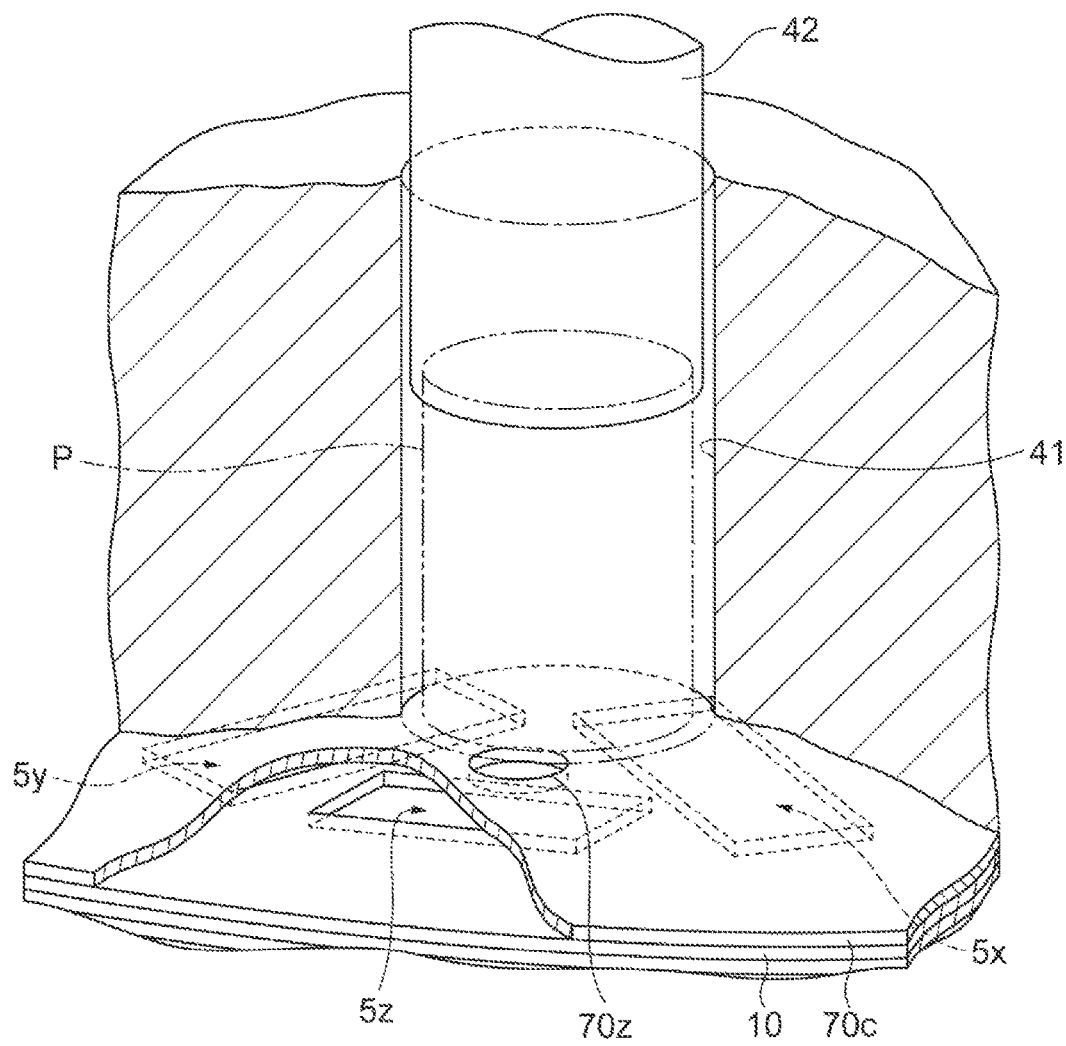
FIG. 9 is a partially cutaway perspective view schematically illustrating neighbors around the resin pot while the resin is injected into the magnet housing holes using the cull plate illustrated in FIG. 5C.

After the cull plates 70a, 70b are placed, the sealing resin 9 in the resin pot 41 is poured into the resin flow paths 70x, 70y communicably connecting the resin pot 41 and the magnet housing holes 5x, 5y, whereby the sealing resin is injected into the magnet housing holes 5x, 5y (see FIG. 7A). Specifically, after the pellets P are supplied into the resin pot 41, the plunger 42 is fitted into the resin pot 41, as illustrated in FIG. 8. The pellets P are then heated by a heater (not illustrated) provided internal to the upper mold 40, and are allowed to melt. By pushing the plunger 42 downwardly after the pellets P melts in the resin pot 41, but before the thermal hardening takes place completely, the sealing resin 9 is injected into the magnet housing holes 5x, 5y via the resin flow paths 70y in the cull plate 70b and the resin flow paths 70x in the cull plate 70a (see FIGS. 7A and 8). From the view of improving the throughput, the time for injecting the sealing resin 9 is approximately 15 seconds to 30 seconds, although the time depends on the size of the magnet housing holes.

As illustrated in FIG. 8, the resin flow path 70x positioned radially outside, among the two resin flow paths 70x provided per one magnet housing hole 5x (or one magnet housing hole 5y), is positioned at an area offset from the area of the resin pot 41 in the plan view. At this point, the resin flow path 70y in the cull plate 70b, which is placed on the cull plate 70a, has the base-end portion 70r extending internally and positioned immediately below the resin pot 41, and the tip portions 70p continuing to the base-end portion 70r and surrounding the external perimeter of the corresponding resin flow path 70x. This configuration can ensure the sealing resin 9 flowing out from the resin pot 41 to reach the resin flow path 70x positioned radially outside via the base-end portion 70r and the tip portions 70p of the resin flow paths 70y. The above description gives the details of the step (B).

Subsequently to the step (B), the sealing resin 9 is injected into the magnet housing hole 5z that is provided interposed between the magnet housing holes 5x, 5y at each pole, with the magnet 7 being disposed in the magnet housing hole 5z (step (C)). The step (C) will now be explained in detail with reference to FIGS. 5C, 6C, 7B, and 9. For the convenience of the explanation, the magnet housing holes 5x, 5y are not illustrated in FIG. 6C, among the magnet housing holes 5x, 5y, 5z, and only the magnet housing hole 5z is illustrated.

At the step (C), to begin with, the cull plates 70a, 70b interposed between the upper mold 40 and the lamination 10 are removed. There are some unnecessary resin members remaining on the surfaces of the cull plates 70a, 70b and having attached when the sealing resin 9 is injected into the magnet housing holes 5x, 5y. By removing the cull plates 70a, 70b, such unnecessary resin members can be removed with the cull plates 70a, 70b from the lamination 10. A cull plate 70c (second plate) is then placed between the upper mold 40 and the lamination 10 (see FIG. 7B). In other words, the cull plate 70c is placed on the top surface 10a of the lamination 10 (see FIG. 6C).

Figure 5C:
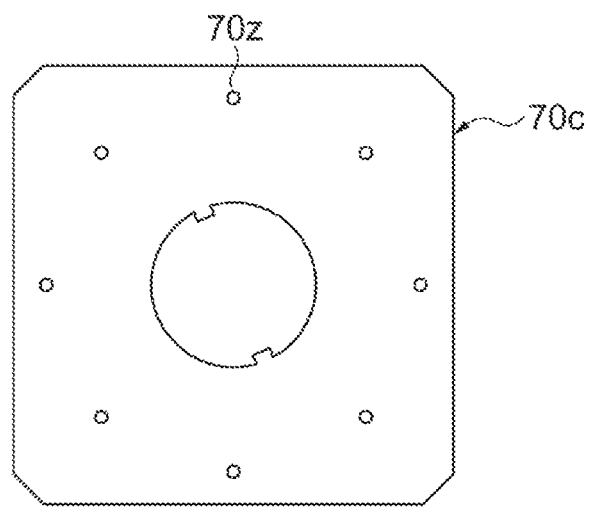
Figure 6A:
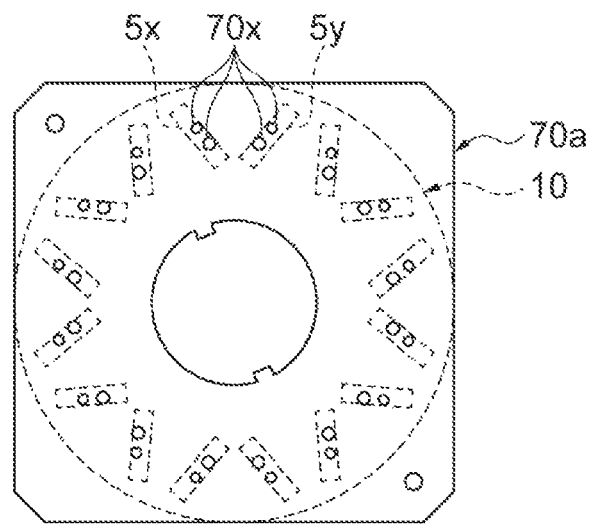
FIG. 6A is a plan view of an arrangement in which the cull plate illustrated in FIG. 5A is placed on the lamination.
Figure 6B:
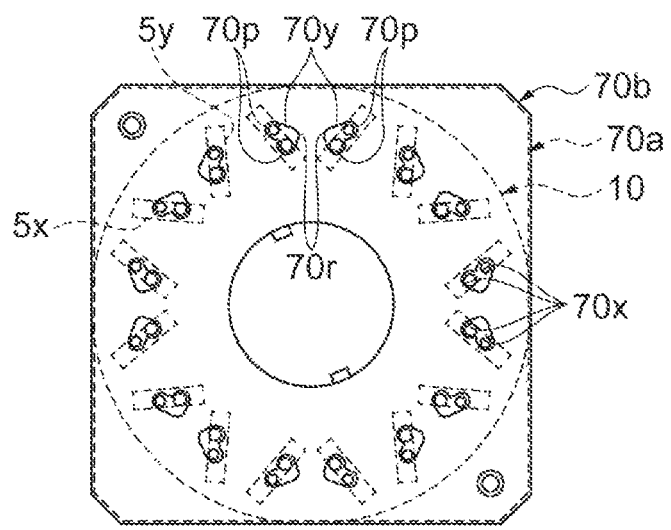
FIG. 6B is a plan view of an arrangement in which the cull plate illustrated in FIG. 5A is placed on the lamination, and the cull plate illustrated in FIG. 5B is further placed on the cull plate illustrated in FIG. 5A.
Figure 6C:
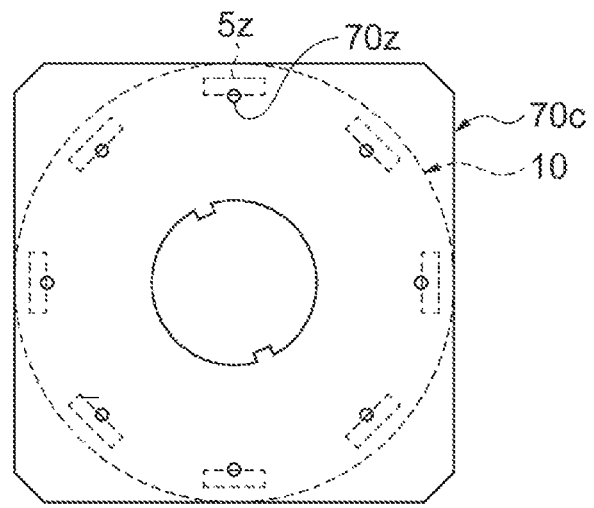
FIG. 6C is a plan view of an arrangement in which the cull plate illustrated in FIG. 5C is placed on the lamination.

As illustrated in see FIG. 5C, the cull plate 70c is provided with a plurality of pass-through holes passing through the cull plate 70c in the thickness direction. These pass-through holes serve as resin flow paths 70z communicably connecting with the magnet housing hole 5z when the cull plate 70c is placed on the lamination 10 (see FIG. 6C). Each of the resin flow paths 70z forms a second resin flow path communicably connecting the corresponding resin pot 41 and magnet housing hole 5z. Each of the resin flow paths 70z have a substantially circular shape in the plan view (see FIG. 5C), and one resin flow path 70z is provided for one magnet housing hole 5z (see FIG. 6C).

After the cull plate 70c is placed, by pouring the sealing resin 9 in the resin pot 41 is poured into the resin flow path 70z communicably connecting the resin pot 41 and the magnet housing hole 5z, whereby the sealing resin is injected into the magnet housing hole 5z (see FIG. 7B). Specifically, after the new pellets P are filled in the resin pot 41, the pellets P are heated by the heater (not illustrated) provided internal to the upper mold 40, and caused to melt. By pushing the plunger 42 downwardly after the pellets P melt in the resin pot 41, but before the thermal hardening takes place completely, the sealing resin 9 is injected into the magnet housing holes 5z, via the resin flow paths 70z in the cull plate 70c (see FIGS. 7B and 9). Among the steps of injecting the resin, the process of filling the new pellets P may be performed at the beginning of the step (C). The above description gives the details of the step (C).

The sealing resin 9 having been injected into the magnet housing holes 5x, 5y, 5z at the step (B) and the step (C) is hardened by heat (step (D)). Specifically, by applying heat to the lamination 10 by a heater (not illustrated) provided to the resin sealing device 50, the thermal hardening of the sealing resin 9 injected into the magnet housing holes 5x, 5y, 5z (thermosetting resin) is promoted. The temperature for heating the thermosetting resin at the step (D) depends on the type of the thermosetting resin, but is preferably 150 to 180 degrees Celsius or so. From the view of improving the throughput, the time spent for the step (D) is preferably 40 to 60 seconds or so. Finally, extra resin pieces are removed, the surface of the lamination 10 is finished, for example, and the laminated core R making up the rotor is completed.

Operational advantages achieved by the method of manufacturing the laminated core R will now be described.

Figure 10:
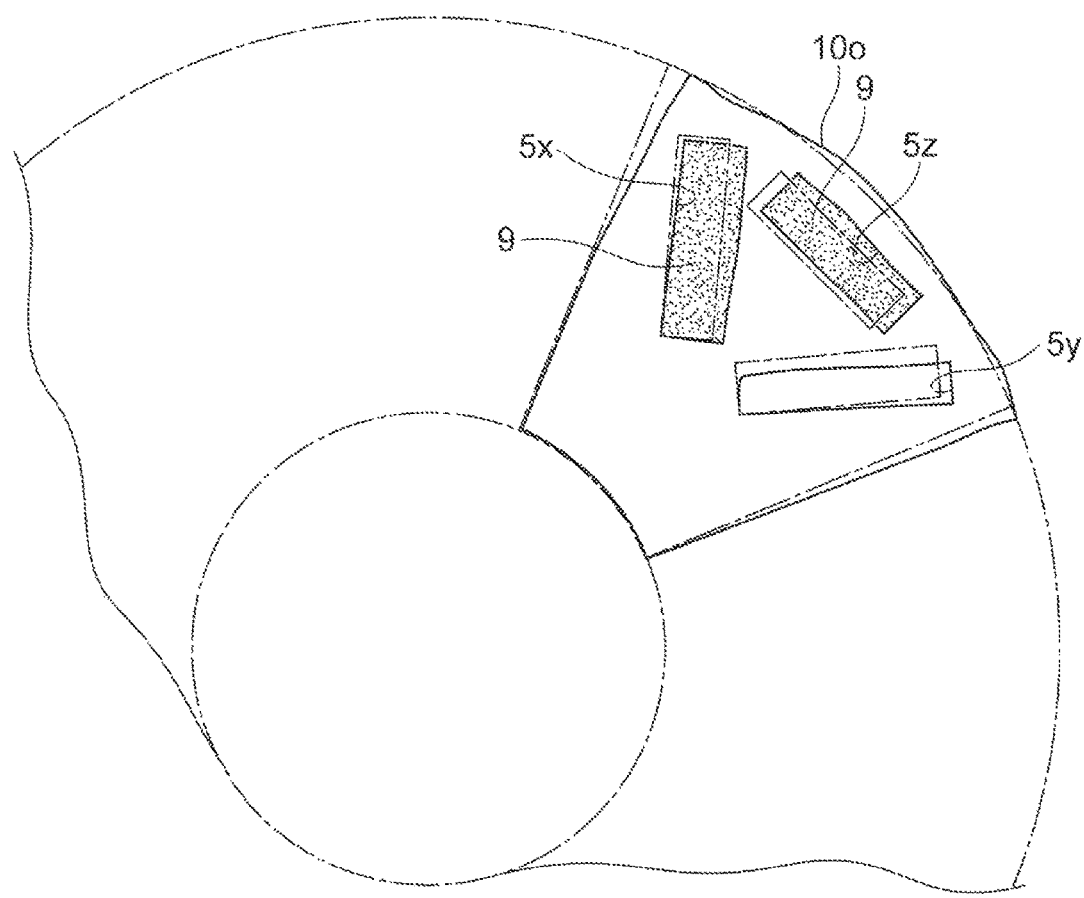
FIG. 10 is a schematic illustrating a deformation occurred in the lamination in a manufacturing method according to a comparative example.

For example, as illustrated in FIG. 10, in a manufacturing method according to a comparative example, the lamination 10 deforms. More specifically, the magnet housing holes 5x, 5y, 5z and the external surface 10o of the lamination 10 go through a deformation. In this manufacturing method according to the comparative example, at one of the steps of injecting the sealing resin 9, the sealing resin 9 is injected into the magnet housing hole 5x and the magnet housing hole 5z, instead of the magnet housing holes 5x, 5y that are arranged at symmetrical positions. In other words, the sealing resin 9 is simultaneously injected (at the same step) into the magnet housing holes in the area decentered in the circumferential direction (magnet housing holes 5x, 5z), at each pole. Therefore, the injection load is applied to the unbalanced area at each pole, so that the internal stress becomes unbalanced. As a result, the magnet housing holes 5x, 5y, 5z and the external surface 10o of the lamination 10 are deformed. The deformations of the shapes of the magnet housing holes 5x, 5y, 5z and the external surface 10o become more prominent because the magnet housing holes 5x, 5y, 5z are arranged near the outer circumference 10c of the lamination 10, and the thickness between the magnet housing holes 5x, 5y, 5z and the outer circumference 10c is thin. In FIG. 10, the dotted lines presenting the shapes of the magnet housing holes 5x, 5y, 5z and the external surface 10o of the lamination 10 represent their shapes before the deformation. In FIG. 10, the deformations are illustrated in an exaggerated manner, by approximately 100 times.

By contrast, in the method of manufacturing the laminated core R according to the embodiment, the sealing resin 9 is injected into the magnet housing holes 5x, 5y arranged at symmetric positions with respect to the line VS extending in the radial direction at the step (B), and the sealing resin is injected into the magnet housing hole 5z that is a magnet housing hole other than the magnet housing holes 5x, 5y at the step (C). When the sealing resin is injected into the magnet housing holes at a plurality of steps, the sealing resin is injected into the magnet housing holes 5x, 5y arranged at symmetrical positions at one of the steps. In this manner, the injection load is applied symmetrically, at one of the steps, with respect to the line VS extending in the radial direction, so that the internal stress resultant of the injection load is balanced. In this manner, the deformation of the laminated core R resultant of the injection load can be reduced.

From the viewpoint of filling the scaling resin 9 in the desired magnet housing holes more reliably and easily, the following configuration is used. In other words, at the step (B), the lamination 10 is placed between the upper mold 40 and the lower mold 30 included in the mold 60 having the upper mold 40 with the resin pots 41, and the lower mold 30, and the sealing resin 9 is injected into pairs of magnet housing holes 5x, 5y via the resin flow paths 70x, 70y communicably connecting the pairs of magnet housing holes 5x, 5y to the resin pot 41, and at the step (C), the lamination 10 is placed between the upper mold 40 and the lower mold 30, and the resin is injected into the magnet housing holes 5z, via the resin flow paths 70z communicably connecting the resin pot 41 and the magnet housing holes 5z. At the step (B) before the sealing resin 9 is injected, the cull plate 70a provided with the resin flow paths 70x, and the cull plate 70b provided with the resin flow paths 70y are placed between the lamination 10 and the upper mold 40 provided with the resin pots 41. At the step (C), before the sealing resin 9 is injected, the cull plate 70c provided with the resin flow paths 70z is placed between the lamination 10 and the upper mold 40 provided with the resin pot 41.

In the method of manufacturing the laminated core R according to the embodiment, each pair of magnet housing holes 5x, 5y is arranged at symmetric positions with respect to the line VS extending in the radial direction, in a manner passing through the center of the area of the corresponding pole, being at the center in the circumferential direction. In this manner, at one of the steps, the sealing resin 9 is injected into the pair of magnet housing holes 5x, 5y arranged symmetrically with respect to the line VS passing through the center in the circumferential direction. In this manner, the injection load of the sealing resin 9 applied to each pole can be balanced further.

The sealing resin can also be injected in such a manner that the internal stress is balanced even in a configuration in which the magnet housing holes are arranged in a manner described below. In other words, in the method of manufacturing the laminated core R according to the embodiment, each of the magnet housing holes 5z is provided interposed between a pair of magnet housing holes 5x, 5y in the plan view. The magnet housing holes 5x, 5y extend in the radial direction of the lamination 10 in the plan view, and each of the magnet housing holes 5z is provided interposed between the corresponding pair of the magnet housing holes 5x, 5y in the circumferential direction, and extends in the circumferential direction of the lamination 10 in the plan view.

Figure 11A:
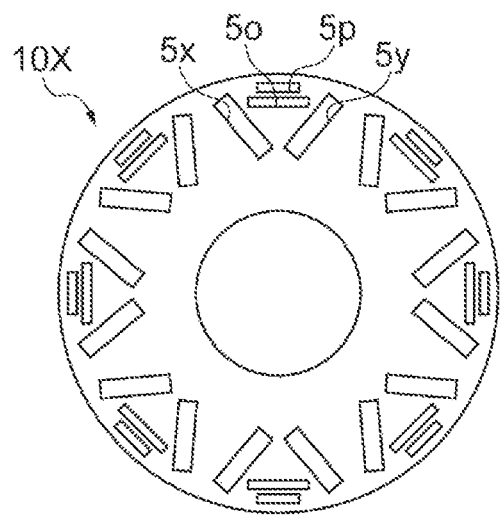
FIG. 11A to FIG. 11C are plan views of rotors according some modifications.
Figure 11B:
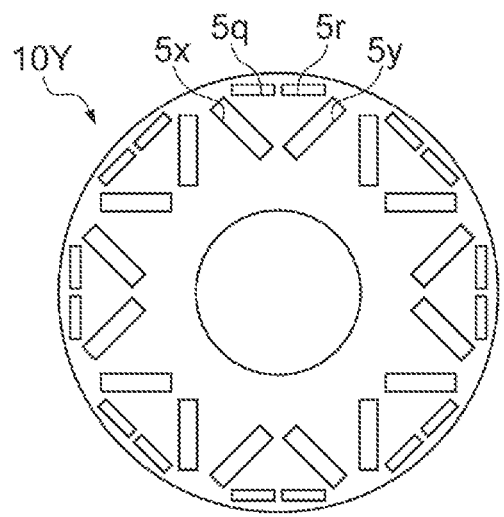
Figure 11C:
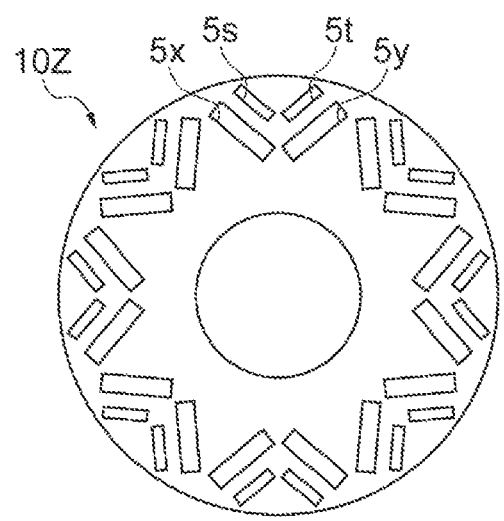

An embodiment of this disclosure is explained above, but this disclosure is not limited to the embodiment described above. For example, the shape of the magnet housing holes extending from the top surface to the bottom surface of the lamination is not limited to that according to embodiment described above. Specifically, as in a lamination 10X illustrated in FIG. 11A magnet housing holes 5o, 5p extending in the circumferential direction and interposed between the pair of magnet housing holes 5x, 5y extending in the radial direction may be provided. The magnet housing holes 5o, 5p are adjacent to each other in the radial direction. As in a lamination 10Y illustrated in FIG. 11B, magnet housing holes 5q, 5r extending in the circumferential direction and interposed between the pair of magnet housing holes 5x, 5y extending in the radial direction may be provided. The magnet housing holes 5q, 5r are adjacent to each other in the circumferential direction. As in a lamination 10Z illustrated in FIG. 11C, magnet housing holes 5s, 5t extending in the radial direction and interposed between the pair of magnet housing holes 5x, 5y extending in the radial direction may also be provided. Each of the magnet housing holes 5s extends in the same direction with the corresponding magnet housing hole 5x, and is adjacent to the magnet housing hole 5x. Each of the magnet housing hole 5t extends in the same direction as the corresponding magnet housing hole 5y, and is adjacent to the magnet housing hole 5y.

Explained above is an example in which the resin flow paths for communicably connecting the resin pots provided to the upper mold and the magnet housing holes are formed by placing the cull plates between the upper mold and lamination, but the embodiment is not limited thereto. For example, the resin pots and the plungers may be provided to the lower mold, and resin flow paths communicably connecting the resin pots provided to the lower mold, and the magnet housing holes may be formed by placing the cull plates between the lower mold and the lamination. In a configuration in which the lower mold has the lamination mounting plate and the lower mold plate, the lamination mounting plate serving as a conveying tray may also serve as a cull plate.

Explained above is an example in which the resin pots and the magnet housing holes are communicably connected by placing the cull plates including the resin flow paths between the mold and the lamination, but the embodiment is not limited thereto. The resin flow paths may be provided to the mold (the upper mold or the lower mold), and the resin flow paths may communicably connect the resin pots and the magnet housing holes. In other words, the upper mold may be provided with the resin pots and the plungers, and the resin pots and the magnet housing holes may be communicably connected by the resin flow paths provided to the upper mold. Alternatively, the lower mold may be provided with the resin pots and the plungers, and the resin pots and the magnet housing holes may be communicably connected by the resin flow paths provided to the lower mold. In this manner, use of the cull plates may be rendered unnecessary, when the communicable connection between the resin pots and the magnet housing holes are established by the resin flow paths included in the mold.

Explained in the embodiment described above is an example in which the same mold is used at the step (B) and the step (C), but different molds may be used at these steps. By preparing the mold for running the step (B) and the mold for running the step (C), and using these molds at the same time, the waiting time can be reduced, and the as a result, the productivity can be improved. In other words, after the step (B) is completed, the laminated core released from the mold may be set to another mold for running the step (C), and in this manner, the next laminated core can be immediately set to the mold for running the step (B). In addition, there are also advantages that the positions of the resin pot can be changed between the step (B) and the step (C), and the arrangement of the resin flow paths can be designed more freely. When the same mold is to be used to run the step (B) and the step (C), there is an advantage that the cost for manufacturing the molds (initial cost) can be reduced.

Figure 12A:
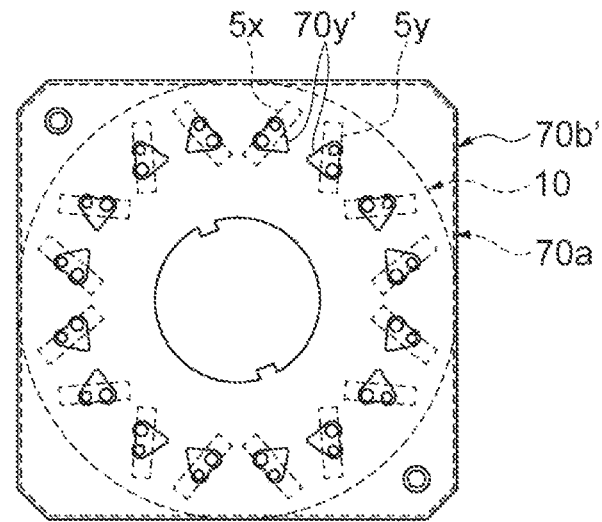
FIGS. 12A and 12B are plan views of cull plates according to some modifications.
Figure 12B:
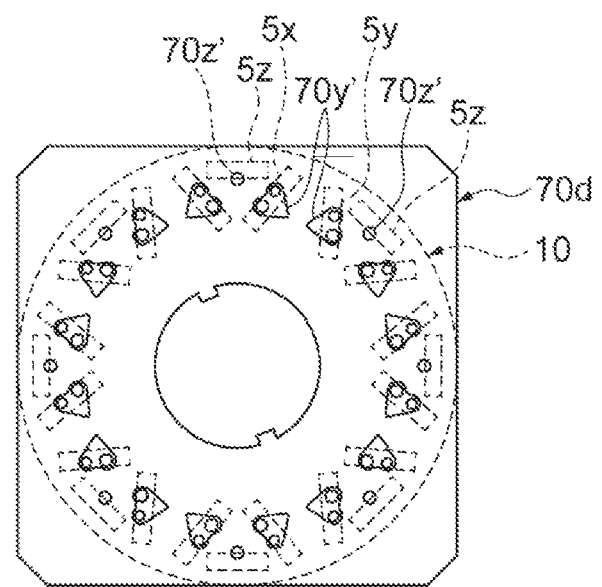

Explained above in the embodiment described above is an example in which the resin is injected into the magnet housing holes 5x, 5y corresponding to the same pole via one resin pot, but the resin may also be injected into the magnet housing hole 5y (or the magnet housing holes 5x) corresponding to one pole and the magnet housing hole 5x (or the magnet housing hole 5y) corresponding to another pole that is adjacent to the one pole, via one resin pot. In other words, a cull plate 70b' illustrated in FIG. 12A may also be used instead of the cull plate 70b illustrated in FIG. 5B. The cull plate 70b' is configured to enable the resin to be injected into each magnet housing hole 5x via a corresponding resin flow path 70y', and into the magnet housing hole 5y corresponding to the adjacent pole via another resin flow path 70y'. In this configuration, the positions of the resin pots are changed between the step (B) and the step (C), but these steps can be run with different molds, in the manner described above. Furthermore, by using a cull plate 70d illustrated in FIG. 12B, the step (B) and the step (C) can be carried out using one cull plate. The cull plate 70d has a plurality of pairs of resin flow paths 70y', in the same manner as the cull plate 70b', and also has resin flow paths 70z' for supplying resin into the magnet housing holes 5z. By using the cull plate 70d, both of the step (B) and the step (C) can be carried out with one cull plate.

Figure 13A:
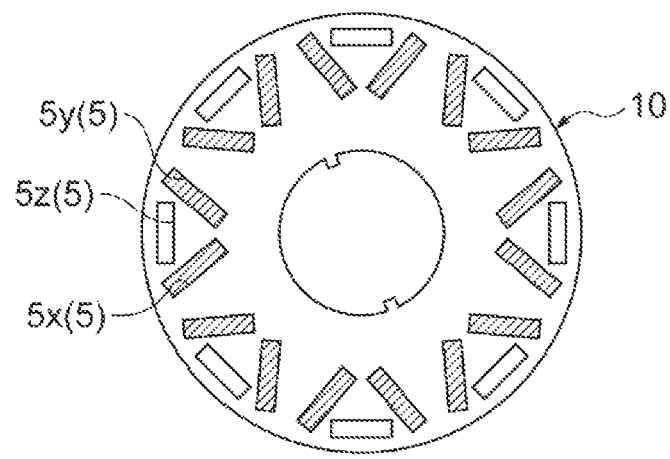
FIG. 13A is a plan view illustrating a configuration in which a pair of magnet housing holes corresponding to one pole is injected with the resin beforehand.
Figure 13B:
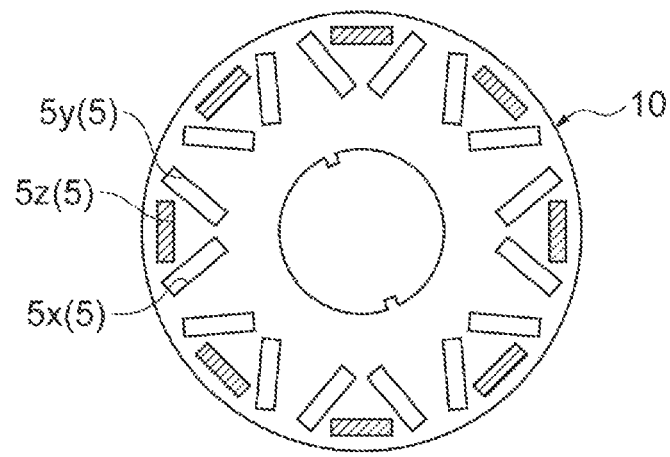
FIG. 13B is a plan view illustrating a configuration in which one of the magnet housing holes corresponding to one pole is injected with the resin beforehand.
Figure 13C:
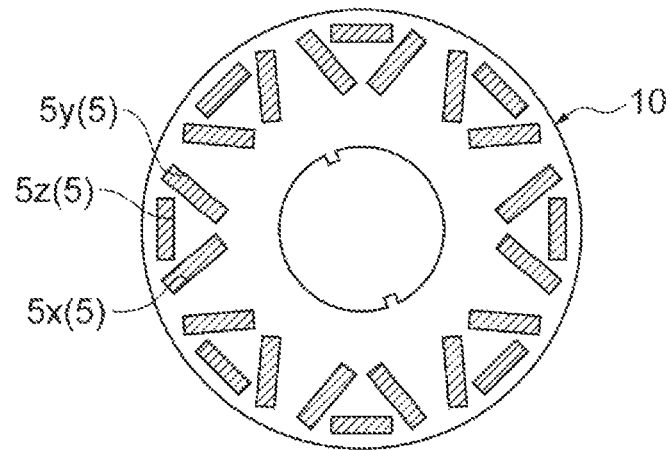
FIG. 13C is a plan view illustrating a configuration in which all of the magnet housing holes corresponding to one pole are injected with the resin.

Explained in the embodiment described above is an example in which the step (B) is performed before the step (C), however, the step (C) may precede. In other words, the resin may be injected into the magnet housing holes 5x, 5y at first, as illustrated in FIG. 13A, or may be injected into the magnet housing holes 5z at first, as illustrated in FIG. 13B. By injecting the resin into the remaining magnet housing holes 5, the resin is injected into the entire magnet housing holes 5, as illustrated in FIG. 13C. The hatched portions in FIGS. 13A to 13C represent the magnet housing holes 5 injected with the resin.

Explained above is an example in which the resin pots and the plungers are provided only to the upper mold, but the embodiment is not limited thereto, and the resin pots and the plungers may be provided to the lower mold as well as the upper mold. In such a configuration, for example, the resin pots in the upper mold are used in injecting the resin into each pair of magnet housing holes arranged symmetrically with respect to a line extending in the radial direction of the lamination, and the resin pot in the lower mold is used to inject resin into the other magnet housing hole, among a plurality of magnet housing holes provided. Alternatively, the resin pots in the lower mold may be used in injecting the resin into the pairs of magnet housing holes, and the resin pots in the upper mold may be used to inject the resin into the other magnet housing holes. In the manner described above, when the resin pots and the plungers are provided to both of the upper mold and the lower mold, the amount of resin that can be injected into the magnet housing holes without refilling can be increased, compared with the configuration in which only one of the upper mold and the lower mold is provided with the resin pots and the like. In this manner, the efficiency of the resin injection can be improved.

Furthermore, a laminated core may also be manufactured by fixing the magnets into the magnet housing holes using means other than sealing the magnets with resin. For example, a laminated core may be manufactured through the following steps:

a step (X) of preparing a lamination having the magnet housing holes;

a step (Y) of press-fitting magnets into each pair of magnet housing holes arranged at symmetric positions with respect to a line extending in the radial direction of the lamination; and a step (Z) of press-fitting magnets into magnet housing holes other than the pairs of magnet housing holes.

Figure 14A:
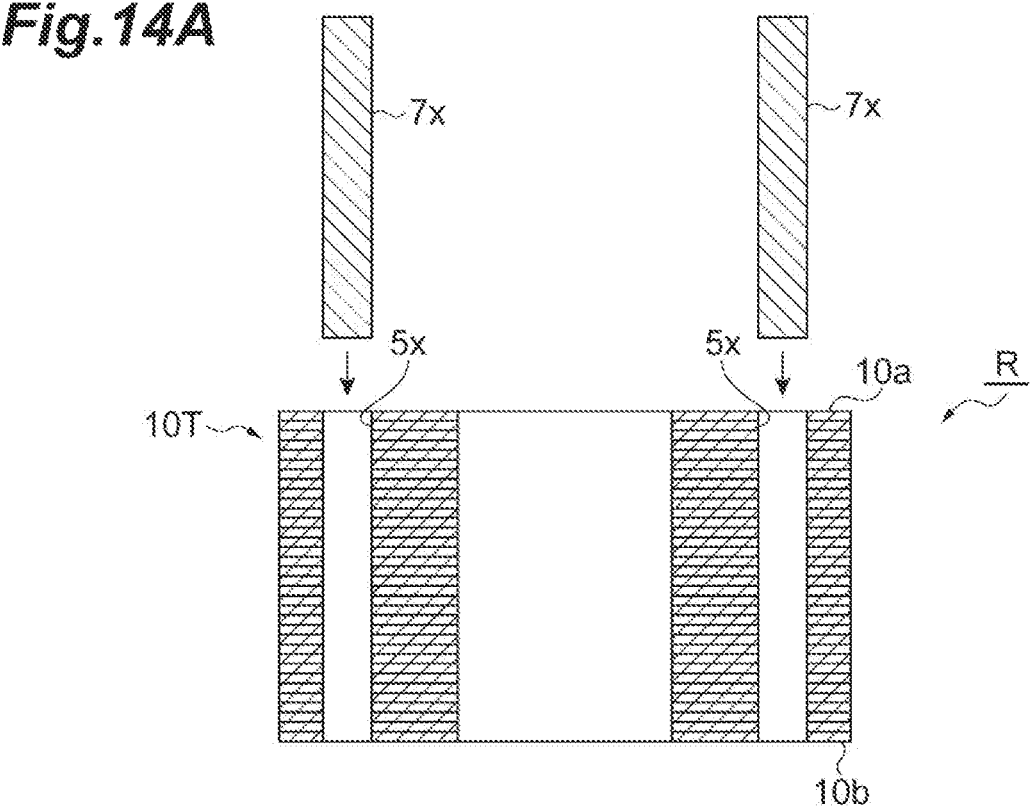
FIG. 14A is a schematic for explaining the press-fitting of the magnets into the magnet housing holes at the step (Y)
Figure 14B:
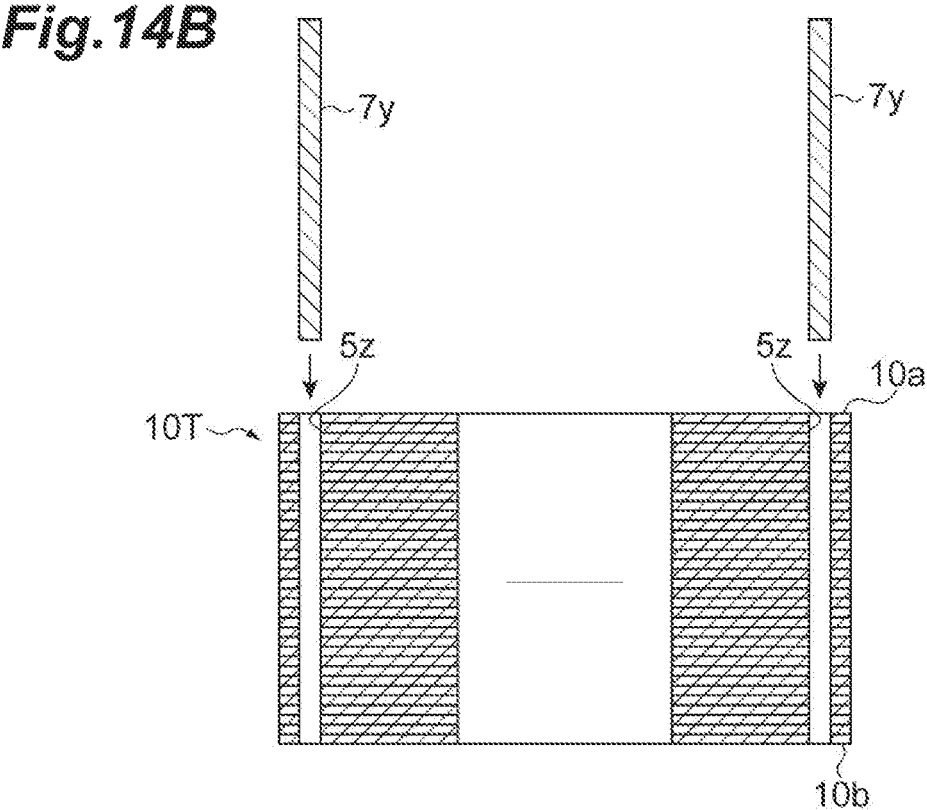
FIG. 14B is a schematic for explaining the press-fitting of the magnets into the magnet housing holes at the step (Z).

The step (Y) and the step (Z) will now be explained in detail with reference to FIGS. 14A and 14B. This lamination 10T illustrated in FIGS. 14A and 14B is provided with pairs of magnet housing holes 5x, 5y, and the magnet housing holes 5z, in the same manner as in the lamination 10 illustrated in FIGS. 3A and 3B. As illustrated in FIG. 14A, at the step (Y), magnets 7x are press-fitted (pushed) into each pair of magnet housing holes 5x, 5y. Each of the magnets 7x has a shape that is the same as, or slightly larger than the magnet housing holes 5x, 5y in the plan view. In other words, the magnet 7x has a shape in a size that can only be inserted into the corresponding magnet housing hole 5x by applying a downward pressure using the upper mold (not illustrated). As illustrated in FIG. 14B, at the step (Z), magnets 7y are press-fitted into the magnet housing holes 5z. In the plan view, each of the magnets 7y has a shape that is the same as, or slightly larger than the magnet housing hole 5z. In other words, the magnet 7y has a shape in a size that can only be inserted into the corresponding magnet housing hole 5z by applying a downward pressure using the upper mold (not illustrated).

In this method of manufacturing a laminated core, the magnets 7x are press-fitted into the pairs of magnet housing holes 5x, 5y arranged symmetrically with respect to a line extending in the radial direction at the step (Y), and the magnets 7y are then press-fitted (pushed) into the magnet housing hole 5z at the step (Z). In this manner, when the press-fitting of the magnets into the magnet housing holes, which is carried out in order to fix the magnets in the magnet housing holes, is performed at a plurality of steps (when it is inevitable for the press-fitting of the magnets to be performed at a plurality of steps due to a structure of the device, for example), at one of the steps, the magnets 7x are press-fitted into the pairs of magnet housing holes 5x, 5y that are symmetrically arranged. This enables the press-fitting load to be applied symmetrically with respect to the line extending in the radial direction at the one step, so that the internal stress resultant of the press-fitting load is balanced out. In this manner, the deformation of the laminated core resultant of the press-fitting load can be reduced. Either one of the step (Y) and the step (Z) may be performed before the other.

The laminated core disclosed in Japanese Unexamined Patent Publication No. 2008-54376 includes one hole 12 per each pole, and a permanent magnet 14 sealed in the hole 12, and is manufactured through a process of supplying sealing resin into the hole 12 from the resin reservoir pot 17 provided per each pole (see FIG. 1(B) in Japanese Unexamined Patent Publication No. 2008-54376). From the viewpoint of improving the magnetic characteristics, development of a laminated core has recently been carried out, including a plurality of housing holes per each pole, and magnets sealed in the respective magnet housing holes (see FIG. 1 in Japanese Unexamined Patent Publication No. 2013-102622, for example).

The inventors of the present invention have investigated for a mass production of such a laminated core including a plurality of magnets per each pole, and found out the following issue needs to be addressed. In other words, when the number of magnet housing holes provided per each pole in the core body (lamination) is increased, the amount of resin required to seal the magnet tends to be increased as well. Because of this reason, there is a risk for the amount of resin to be supplied into the magnet housing holes, provided in plurality per each pole, to exceed the amount of resin which the one resin pot is capable of supplying. As countermeasures for this issue, the capacity of the resin pot may be increased, or the number of resin pots may be increased, for example. These countermeasures, however, require a great amount of modification in the molds, or new molds to be prepared, and, as a result, these countermeasures will induce a cost increase.

To address this issue, the inventors have investigated for a possibility of supplying the sealing resin, at a plurality of number of times, into the magnet housing holes, provided in plurality, from the resin pot which is provided in singularity per each pole. In other words, the inventors experimentally manufactured a laminated core by injecting the sealing resin into some of the magnet housing holes that are provided per each pole, filling the resin pot again with the sealing resin, and injecting the sealing resin into the remaining magnet housing holes. As a result a deformation of the laminated core was observed, which did not occur when the sealing resin was supplied from the single resin pot into all of the magnet housing holes at once.

This disclosure is made in consideration of the situation above, and an object of this disclosure is to provide a method of manufacturing a laminated core in which a deformation of the laminated core at the step of fixing the magnets in the magnet housing holes can be reduced sufficiently.

The inventors have investigated for the cause of the deformation of the laminated core, which occurred when the sealing resin was injected into the magnet housing holes at a plurality of number of times. As a result, the inventors have gained the knowledge that, a main cause of this deformation is an unbalanced internal stress generated at each pole, due to the force applied to the core body as the sealing resin is injected (see FIG. 10). This disclosure is made based on this knowledge.

One aspect of the present invention relates to a method of manufacturing a laminated core including a plurality of poles arranged side by side in a circumferential direction, each pole having three or more magnet housing holes and magnets housed in the magnet housing holes. This manufacturing method includes: a step (A) of preparing a lamination having the magnet housing holes; a step (B) of injecting sealing resin into a pair of magnet housing holes among the three or more magnet housing holes, the pair of magnet housing holes being arranged at symmetric positions with respect to a line extending in a radial direction of the lamination, with the magnets being disposed in the pair of respective magnet housing holes; and a step (C) of injecting sealing resin into a magnet housing hole other than the pair of magnet housing holes among the three or more magnet housing holes, with the magnet being disposed in the magnet housing hole.

In the method of manufacturing a laminated core, two of the magnet housing holes (a pair of magnet housing holes) to which the resin is to be injected simultaneously are selected in such a manner that no unbalanced internal stresses is generated at each pole when the resin is injected, in other words, in such a manner that the internal stress is balanced at each pole. In other words, as mentioned above, at the step (B), the sealing resin is injected into a pair of magnet housing holes that are arranged at symmetric positions with respect to a line extending in a radial direction of the lamination. In this manner, at the step (B), the injection load is applied symmetrically with respect to the line extending in the radial direction, so that the internal stress resultant of the injection load is balanced. Therefore, the deformation of the laminated core due to the injection load can be reduced sufficiently. At the step (C), the sealing resin is injected into the magnet housing hole other than the pair of magnet housing holes. The laminated core is manufactured through the step (B) and the step (C). As long as the step (A) has been completed, the step (C) may be run after the step (B) is run, or the step (B) may be run after the step (C) is run.

From the viewpoint of filling the sealing resin into the desired magnet housing holes at the step (B) and the step (C), the following configuration may be used. According to one aspect of the present invention, at the step (B), the lamination is placed between an upper mold and a lower mold provided to a mold, at least one of the upper mold and the lower mold being provided with a resin pot, and the sealing resin is injected into the pair of magnet housing holes via a first resin flow path communicably connecting the resin pot and the pair of magnet housing holes, and at the step (C), the lamination is placed between the upper mold and the lower mold, and the sealing resin is injected into the other magnet housing hole via a second resin flow path communicably connecting the resin pot and the other magnet housing hole. According to another aspect of the present invention, at the step (B), a first plate provided with the first resin flow path is placed between the lamination and the mold provided with the resin pot, before the sealing resin is injected, and at the step (C), a second plate provided with the second resin flow path is placed between the lamination and the mold provided with the resin pot, before the sealing resin is injected.

The pair of magnet housing holes may be provided at symmetrical positions with respect to a line extending in the radial direction and passing through the center of the area of the corresponding pole, being at the center in the circumferential direction. In this manner, at the step (B), the sealing resin is injected into the pair of magnet housing holes that are arranged at symmetrical positions with respect to the line passing through the center in the circumferential direction. In this manner, the injection load at each pole can be balanced further.

The sealing resin can be injected in a manner enabling the internal stress resultant of the injection load to be balanced even in a configuration in which the magnet housing holes are provided in a manner described below. In other words, according to one aspect of the present invention, the other magnet housing hole is provided interposed between the pair of magnet housing holes in a plan view. According to another aspect of the present invention, the pair of magnet housing holes extends in the radial direction of the lamination in the plan view, and the other magnet housing hole is provided interposed between the pair of magnet housing holes in the circumferential direction, and extends in the circumferential direction of the lamination in the plan view.

Furthermore, according to another aspect of the present invention, a method of manufacturing a laminated core including a plurality of poles arranged side by side in a circumferential direction, each pole having three or more magnet housing holes and magnets housed in the respective magnet housing holes, the method includes: a step (X) of preparing a lamination having the magnet housing holes; a step (Y) of press-fitting the magnets into a pair of magnet housing holes among the three or more magnet housing holes, the pair of magnet housing holes being arranged at symmetric positions with respect to a line extending in the radial direction of the lamination; and a step (Z) of press-fitting the magnet into a magnet housing hole other than the pairs of magnet housing holes among the three or more magnet housing holes.

In the method of manufacturing a laminated core, at the step (Y), the magnets are press-fitted into a pair of magnet housing holes arranged at symmetric positions with respect to a line extending in the radial direction of the lamination, and at the step (Z), the magnet is press-fitted into the magnet housing hole other than the pair of magnet housing holes. When press-fitting of the magnets, for fixing the magnets in the magnet housing holes, are performed at a plurality of steps (when it is inevitable for the magnets to be the press-fitted at a plurality of steps due to a structure of the device, for example), the magnets are press-fitted into the pair of magnet housing holes arranged at symmetrical positions at one of the steps. In this manner, at the one of the steps, a press-fitting load is applied symmetrically with respect to the line extending in the radial direction, and the internal stress resultant of the press-fitting load is balanced. In this manner, the deformation of the laminated core resultant of the press-fitting load can be reduced. Any one of the step (Y) and the step (Z) may be performed before the other.

According to this disclosure, a deformation of the laminated core at the step of fixing magnets in a plurality of respective magnet housing holes can be reduced sufficiently.

What is claimed is:

1. A method of manufacturing a laminated core including a plurality of poles arranged side by side in a circumferential direction, each pole having three or more magnet housing holes, and magnets housed in the magnet housing holes, the manufacturing method comprising:
   a step (A) of preparing a lamination having the magnet housing holes;
   a step (B) of injecting sealing resin into a pair of magnet housing holes among the three or more magnet housing holes, the pair of magnet housing holes being arranged at symmetric positions with respect to a line extending in a radial direction of the lamination, with the magnets being disposed in the pair of magnet housing holes; and
   a step (C) of injecting sealing resin into a magnet housing hole other than the pair of magnet housing holes among the three or more magnet housing holes, with another magnet being disposed in the magnet housing hole,
   wherein after the step (A) has been completed, the step (B) is run, followed by the step.

2. The method of manufacturing a laminated core according to claim 1, wherein
   at the step (B), the lamination is placed between an upper mold and a lower mold provided to a mold, at least one of the upper mold and the lower mold being provided with a resin pot, and the sealing resin is injected into the pair of magnet housing holes via a first resin flow path communicably connecting the resin pot and the pair of magnet housing holes, and
   at the step (C), the lamination is placed between the upper mold and the lower mold, and the sealing resin is injected into the other magnet housing hole via a second resin flow path communicably connecting the resin pot and the other magnet housing hole.

3. The method of manufacturing a laminated core according to claim 2, wherein
   at the step (B), a first plate provided with the first resin flow path is placed between the lamination and the mold provided with the resin pot, before the sealing resin is injected, and
   at the step (C), a second plate provided with the second resin flow path is placed between the lamination and the mold provided with the resin pot, before the sealing resin is injected.

4. The method of manufacturing a laminated core according to claim 1, wherein
   the pair of magnet housing holes are provided at symmetrical positions with respect to the line extending in the radial direction and passing through a center of a corresponding polein the circumferential direction.

5. The method of manufacturing a laminated core according to claim 1, wherein the other magnet housing hole is provided interposed between the pair of magnet housing holes in a plan view.

6. The method of manufacturing a laminated core according to claim 5, wherein
   the pair of magnet housing holes extends in the radial direction of the lamination in the plan view, and
   the other magnet housing hole is provided interposed between the pair of magnet housing holes in the circumferential direction, and extends in the circumferential direction of the lamination in the plan view.

7. The method of manufacturing a laminated core according to claim 2, comprising a step of switching from the first resin flow path to the second resin flow path between the step (B) and the step (C).

8. The method of manufacturing a laminated core according to claim 3, comprising a step of changing the first plate to the second plate between the step (B) and the step (C).

9. A method of manufacturing a laminated core including a plurality of poles arranged side by side in a circumferential direction, each pole having three or more magnet housing holes, and magnets housed in the magnet housing holes, the manufacturing method comprising:
   a step (A) of preparing a lamination having the magnet housing holes;
   a step (B) of injecting sealing resin into a pair of magnet housing holes among the three or more magnet housing holes, the pair of magnet housing holes being arranged at symmetric positions with respect to a line extending in a radial direction of the lamination, with the magnets being disposed in the pair of magnet housing holes; and
   a step (C) of injecting sealing resin into a magnet housing hole other than the pair of magnet housing holes among the three or more magnet housing holes, with another magnet being disposed in the magnet housing hole,
   wherein after the step (A) has been completed, the step (B) and the step (C) are performed sequentially.

* * * * *